United States Patent
Zaugg et al.

(10) Patent No.: US 11,946,553 B2
(45) Date of Patent: Apr. 2, 2024

(54) EXPLOSION PROTECTION VALVE FOR DECOUPLING SYSTEM PARTS OR WORKPIECES, COMPRISING A BEARING ASSEMBLY FOR THE VALVE CLOSING BODY

(71) Applicant: Rico Sicherheitstechnik AG, Herisau (CH)

(72) Inventors: Loïc Zaugg, Herisau (CH); Walter Aloi, Widnau (CH); Jürgen Kern, Weinfelden (CH); Aleksandar Agatonovic, Eschlikon (CH); Daniel Zellweger, Gais (CH)

(73) Assignee: Rico Sicherheitstechnik AG, Herisau (CH)

( * ) Notice: Subject to any disclaimer, the term of this patent is extended or adjusted under 35 U.S.C. 154(b) by 123 days.

(21) Appl. No.: 17/601,905

(22) PCT Filed: Apr. 6, 2020

(86) PCT No.: PCT/EP2020/059720
§ 371 (c)(1),
(2) Date: Oct. 6, 2021

(87) PCT Pub. No.: WO2020/207948
PCT Pub. Date: Oct. 15, 2020

(65) Prior Publication Data
US 2022/0205549 A1 Jun. 30, 2022

(30) Foreign Application Priority Data
Apr. 8, 2019 (DE) .................... 10 2019 205 026.3

(51) Int. Cl.
*F16K 17/30* (2006.01)
*F16K 17/26* (2006.01)
*F16K 27/02* (2006.01)

(52) U.S. Cl.
CPC .......... *F16K 17/30* (2013.01); *F16K 27/0209* (2013.01); *F16K 17/26* (2013.01)

(58) Field of Classification Search
CPC .......... F16K 17/30; F16K 17/26; F16K 17/36; F16K 1/465; F16K 27/02
See application file for complete search history.

(56) References Cited

U.S. PATENT DOCUMENTS

| 7,343,927 B2 * | 3/2008 | Zellweger | ............... F16K 17/26 137/460 |
| 8,534,314 B2 * | 9/2013 | Zellweger | ............... F16K 17/26 137/460 |

(Continued)

FOREIGN PATENT DOCUMENTS

| CH | 606882 A5 * | 11/1978 |
| CH | 694303 A5 | 11/2004 |

(Continued)

OTHER PUBLICATIONS

Machine Translation of CH694377 retrieved from espacenet.com Apr. 2023 (Year: 2023).*

(Continued)

*Primary Examiner* — Jessica Cahill
(74) *Attorney, Agent, or Firm* — McGlew and Tuttle, P.C.

(57) ABSTRACT

An explosion protection valve for decoupling system parts or workpieces, in particular for the installation in a pipeline, comprising
  a housing,
  a closing body which is axially guided inside the housing on a guide rod and can be displaced from a defined open position in the event of one of the group comprising a pressure and suction wave in the pipeline in at least one closing movement direction into a sealing closed position in which the closing body can be fixed by means of a locking device, (Continued)

a spring assembly, which is in operative connection to the closing body, on the guide rod for holding the closing body in the open position, bearing assemblies each carrying the end of the guide rod, which are each connected to the housing by means of at least one suspension cross-member, and a bearing arrangement, which is subject to play, of the at least one suspension cross-member in a receiving opening on the housing.

14 Claims, 5 Drawing Sheets

(56) References Cited

U.S. PATENT DOCUMENTS

| | | | | |
|---|---|---|---|---|
| 9,322,484 | B2* | 4/2016 | Becker | F16K 31/56 |
| 2009/0120512 | A1* | 5/2009 | Berry | B41J 2/17513 |
| | | | | 347/85 |

FOREIGN PATENT DOCUMENTS

| | | | | |
|---|---|---|---|---|
| CH | 694377 | A5 * | 12/2004 | ............. F16K 17/26 |
| CH | 694377 | A5 | 12/2004 | |
| CN | 206830903 | U | 1/2018 | |
| DE | 10141348 | A1 | 3/2002 | |
| DE | 102010050781 | A1 | 5/2012 | |
| DE | 10141348 | B4 | 5/2013 | |
| DE | 10213865 | B4 | 6/2016 | |
| EP | 0172364 | * | 2/1986 | |
| EP | 1897668 | A1 | 3/2008 | |
| EP | 1579134 | B1 | 7/2010 | |
| WO | WO-2018188776 | A1 * | 10/2018 | |

OTHER PUBLICATIONS

Machine Translation EP0172364 retrieved from espacenet.com Apr. 2023 (Year: 2023).*

* cited by examiner

EXPLOSION PROTECTION VALVE FOR DECOUPLING SYSTEM PARTS OR WORKPIECES, COMPRISING A BEARING ASSEMBLY FOR THE VALVE CLOSING BODY

CROSS-REFERENCES TO RELATED APPLICATIONS

This application claims the priority of German Patent Application, Serial No. 10 2019 205 026.3, filed Apr. 8, 2019, the content of which is incorporated herein by reference in its entirety as if fully set forth herein.

FIELD OF THE INVENTION

The invention relates to an explosion protection valve for decoupling system parts or workpieces for the installation in a pipeline, having the features indicated in the generic term of claim 1.

BACKGROUND OF THE INVENTION

Explosion protection valves of this type are known from a large number of publications, in particular those of the applicant. Thus, the basic operating principle of these explosion protection valves with a housing, with a closing body axially guided within the housing on a guide rod, which closing body is displaceable from a defined open position in the event of a pressure or suction wave in the pipeline in at least one closing movement direction into a sealing closed position, with a spring assembly on the guide rod, which is operatively connected to the closing body, for holding the closing body in the open position, and with bearing assemblies which each carry the end of the guide rod and are each connected to the housing via at least one suspension cross-member, is known from CH 694 303 A5 or CH 694 377 A5.

In the explosion protection valves shown, the suspension cross-members for the bearing assemblies of the guide rod are each firmly connected with the valve housing, for example by welding or screwing. This means that manufacturing tolerances, for example due to welding distortion or assembly of the individual components, cannot be compensated or at least not in a defined manner.

Furthermore, in the constructions shown, there is the problem that the free flow cross-section of the valve is affected not only by the actual bearing assemblies for the closing mechanism, but also by additional functional means. Such functional means may be formed, for example, by the necessary externally resettable locking device of the closing body in its closed position or by sensing devices for generating an electric signal representing the valve position.

Explosion protection valves with the basic structure and functional sequence as well as suspensions with the described problems can also be taken from DE 102 13 865 B4, EP 1 579 134 B1, EP 1 897 668 B1 and DE 101 41 348 B4 of the applicant.

SUMMARY OF THE INVENTION

An object of the invention is to improve an explosion protection valve of the generic type in such a way that tolerances in the constructional design of the valve can be compensated better, in particular for optimizing the valve sealing behavior.

According to the invention, this object is achieved in that the suspension of the bearing assemblies for the guide rod carrying the closing body takes place with play in a receiving opening in the housing. This type of "floating bearing" creates so-called "constructive air" between the suspension cross-member and the housing, which enables the very desired tolerance compensation.

In addition, preferred further developments of this bearing arrangement subject to play are indicated. Thus, the at least one suspension cross-member may be mounted on the housing via a receiving adapter which is situated in a flexible retaining ring. This flexible retaining ring stabilizes the attachment of the suspension cross-member within the possible play, and at the same time may provide a reliable sealing of the valve housing in the region of the connection of the suspension cross-member to the housing. The flexible retaining ring thus fulfills a dual function.

Although the flexible retaining ring may be designed as a simple O-ring, the design of the flexible retaining ring in the manner of an edge protection profile is advantageous, since it can be fastened on the rim of the receiving opening of the housing with a bearing groove. This serves to stabilize the bearing arrangement of the retaining ring on the housing and at the same time to simplify the assembly.

Comprehensive tolerance compensation is possible if the bearing play of the suspension cross-members acts in the radial and axial direction.

The bearing arrangement subject to play according to the invention can be implemented in a particularly skillful manner in terms of construction if a planar bearing surface for the bearing arrangement of the suspension cross-member in the receiving opening is in each case applied to the otherwise cylindrical, tubular housing portion. In particular, this simplifies the integration of the flexible retaining ring into the constructional design. At the same time, the sealing of the valve housing is optimized, since the two sealing surfaces are parallel to each other. Otherwise, the planar sealing surface of the receiving adapter would have to be sealed on the otherwise cylindrical, tubular housing portion.

The planar bearing surface may preferably be embossed in the bearing portion, which is especially rational in terms of production, in particular if the receiving opening is punched at the same time.

The underlying problem of one further aspect of the invention was also addressed at the beginning Thus, the suspension cross-members may serve not only to support the closing body mechanism, but also to receive and integrate further functional means, such as a locking device for the closing body mechanism and/or a sensing device for the valve position. This functional integration may be used in a particularly advantageous manner in interaction with the bearing arrangement subject to play of the suspension cross-members, since tolerances within the conceptional design of the explosion protection valve then do not have a negative effect on the function of the aforementioned functional means. However, it should be pointed out that the integration idea may also be implemented in an explosion protection valve without a bearing arrangement subject to play, in accordance with the invention in order to achieve as free a flow cross section as possible within the valve housing.

Accordingly, therefore, functional means of the locking device and/or of the sensing device for the valve position are integrated into the suspension cross-members.

It is possible that all functional means engaging in the housing are integrated in a respective suspension cross-member. This basically eliminates constructive elements which would interfere with the free flow cross-section in addition to the suspension cross-members.

According to a further preferred embodiment, all suspension cross-members may be configured to receive functional means. For example, in the case of a bidirectionally acting explosion protection valve, a locking device and a sensing device must be provided for the functional mechanism of the closing body for each triggering direction, which results in a total of four functional means. Accordingly, these may be integrally included in the structure of the explosion protection valve via four suspension cross-members for the closing body mechanism.

If suspension cross-members are not occupied with functional means, the receiving adapter mentioned at the beginning for bearing the suspension cross-member in the receiving opening may be designed as a closure lid. This ensures the tightness of the explosion protection valve even when the suspension cross-member is not occupied.

Further features, details and advantages of the invention will be apparent from the following description of an embodiment example with reference to the attached drawings.

DESCRIPTION OF THE PREFERRED EMBODIMENTS

Figure 1:
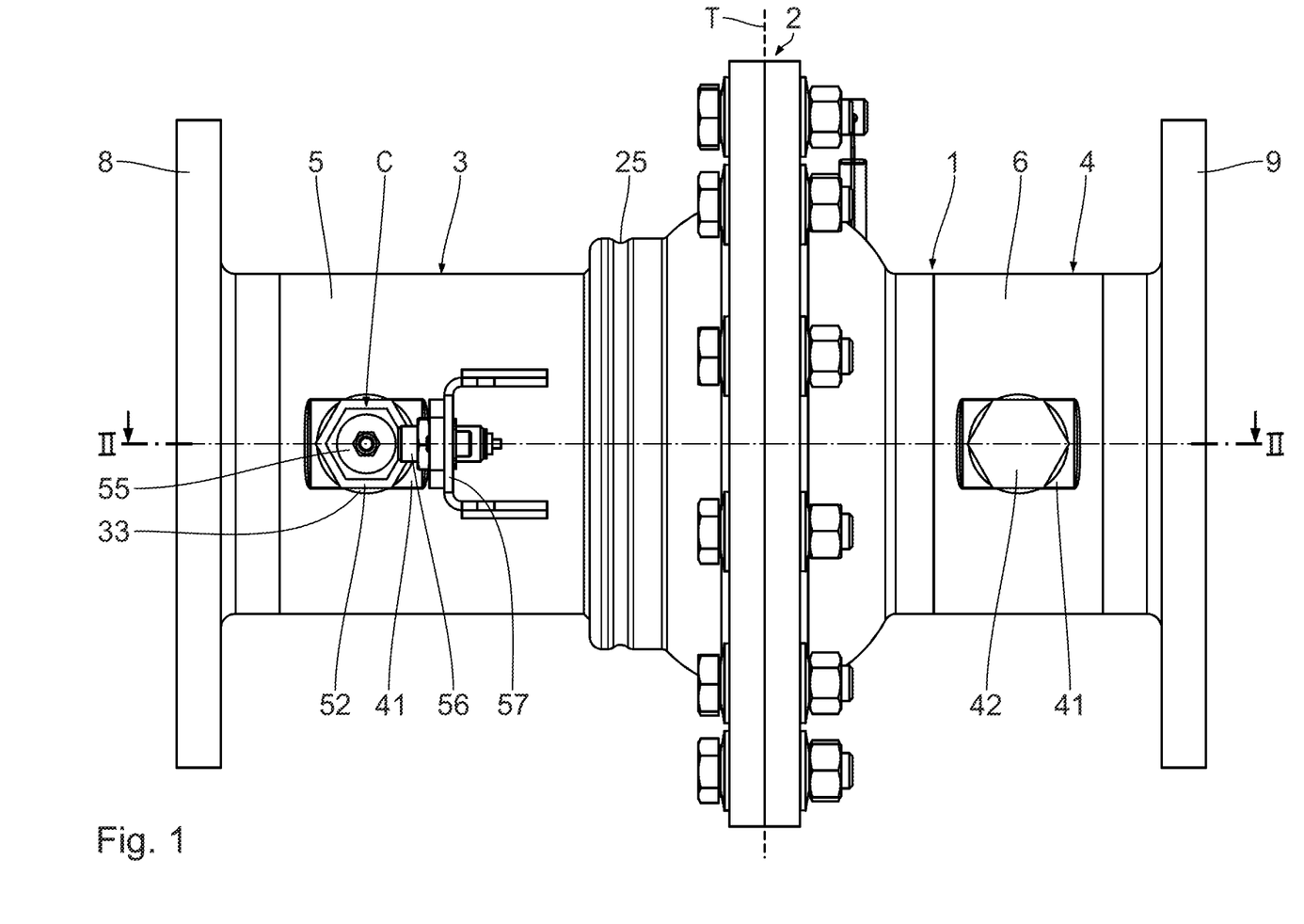
FIG. 1 shows a view of an explosion protection valve from the direction of arrow I according to FIG. 2.
Figure 2:
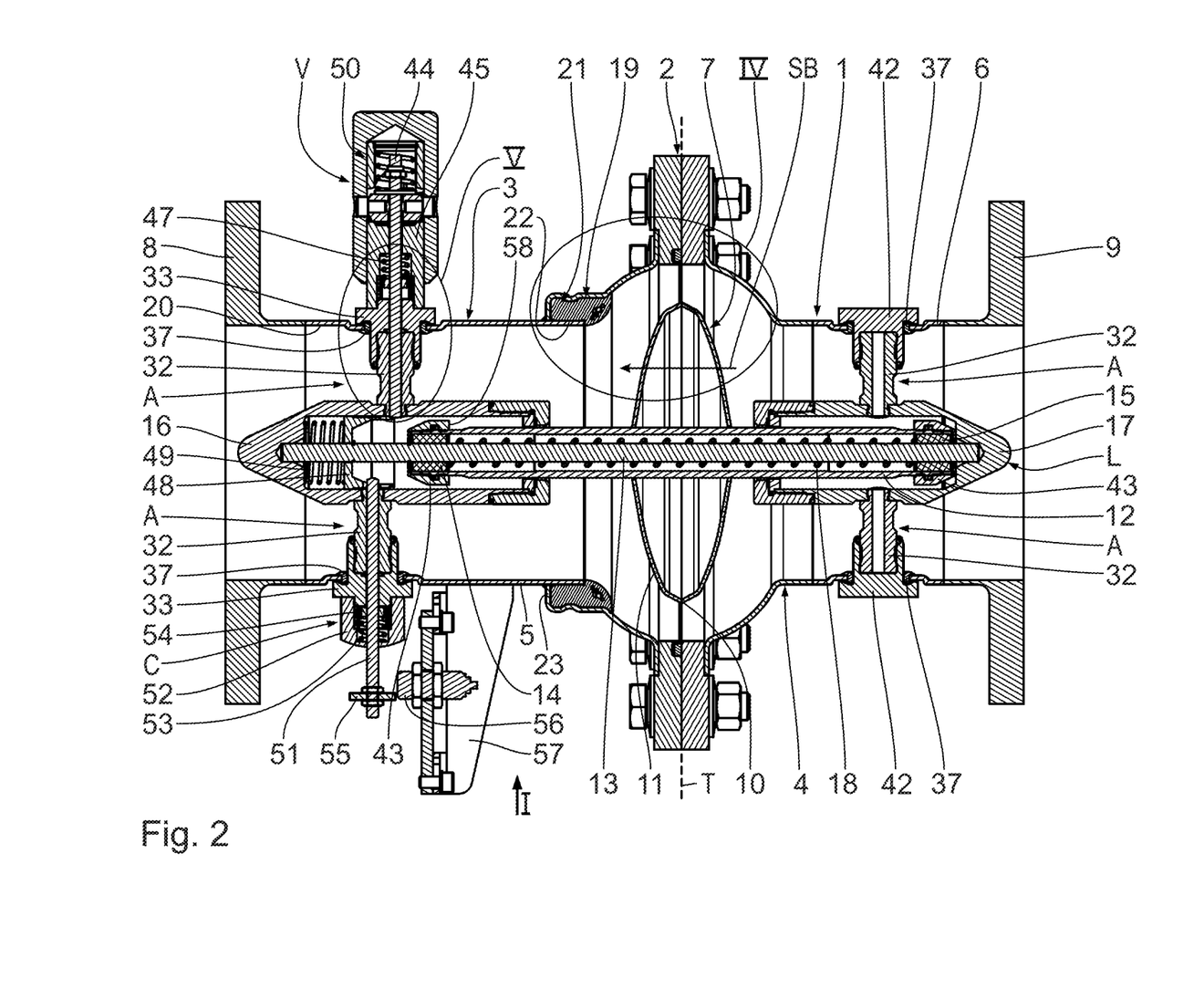
FIG. 2 shows an axial section of the explosion protection valve according to the section line II-II in FIG. 1.
Figure 3:
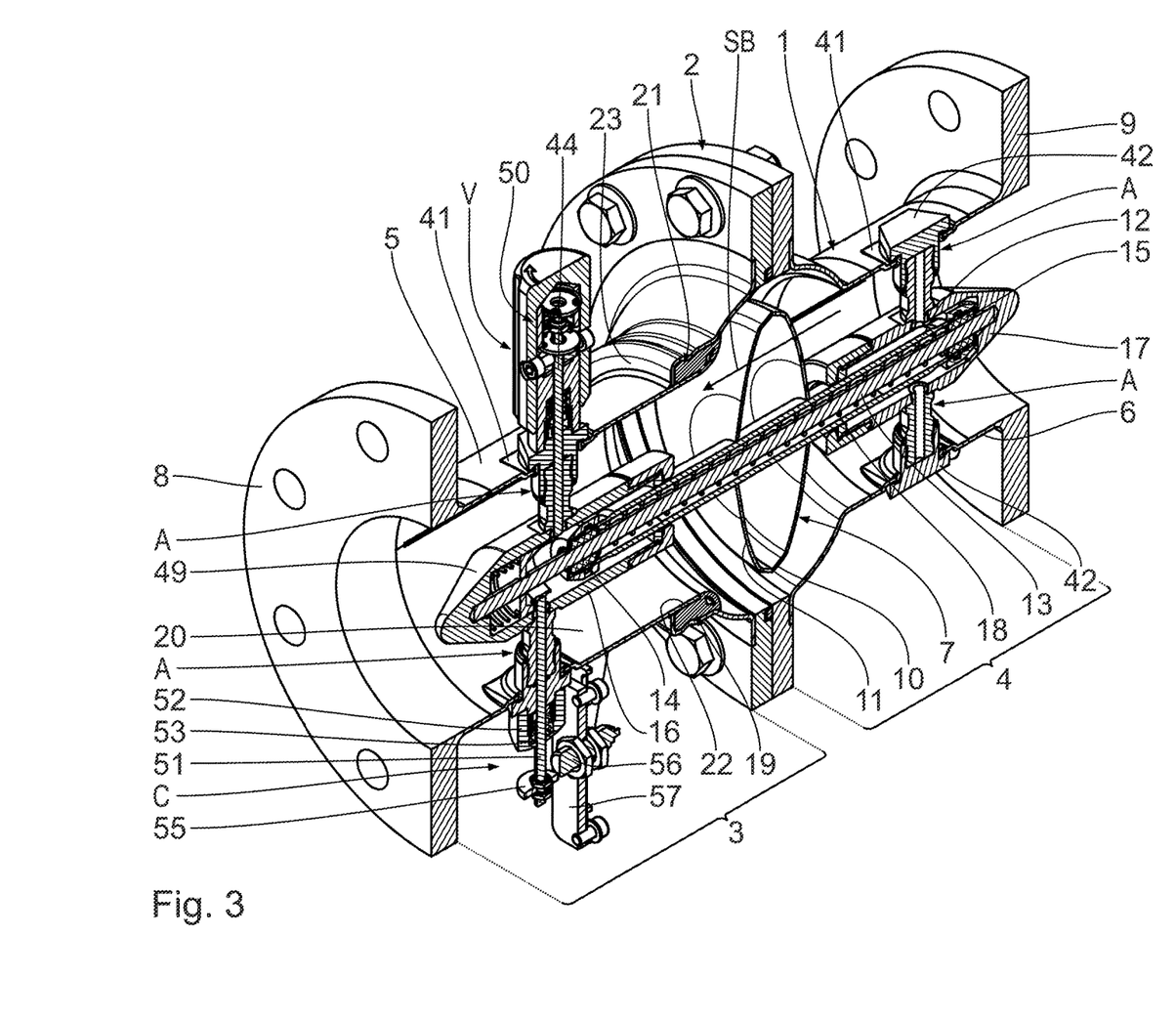
FIG. 3 shows a perspective view, broken away in the sectional plane of FIG. 2, of the explosion protection valve according to FIG. 1, FIGS. 4 and 5 show enlarged detail sections of details IV and V according to FIG. 2

As can be seen from FIGS. 1 to 3, the explosion protection valve shown has a housing 1 composed of two housing halves 3, 4 detachably connected to each other at a central flange connection 2. Towards the flange connection 2, the two housing halves 3, 4 are radially widened with respect to their tubular housing portions 5, 6 in order to ensure a sufficient flow cross-section through the valve in the region of the closing body 7 of the valve, which will be discussed in more detail. At the ends facing away from the flange connection 2, the housing halves 3, 4 are in turn provided with connecting flanges 8, 9 with which the explosion protection valve can be installed in a pipeline not shown.

The internal structure of the explosion protection valve shall be explained with reference to FIGS. 2 and 3. For instance, the mentioned closing body 7 is designed as a rotation-symmetrical hollow body, approximately elliptical in cross-section, around which a medium can flow in the open position shown in FIGS. 2 and 3. The shaping of the closing body 7 with a so-called interfering edge 10 at the periphery and sealing edges 11 is known, for example, from the EP 1 579 134 B1 mentioned at the beginning and does not need to be discussed again here.

The closing body 7 is fastened to a carrier tube 12 which, for the indirect mounting of the closing body 7, is guided for longitudinal axial displacement on a central, longitudinally axially arranged guide rod 13 via sliding bushes 14, 15. The guide rod 13 itself is fastened at each of its ends in cylindrical retaining pieces 16, 17, each of which is designed to be conically tapered in the direction of the flanges 8, 9 in order to optimize the flow conditions through the valve. The retaining pieces 16, 17 are in turn held centrally in the tubular housing portions 5, 6 of the housing halves 3, 4 via four suspensions A to be explained in more detail.

A preloaded helical compression spring 18 is inserted between the guide rod 13 and the carrier tube 12, which is supported, on the one hand, on the left-hand slide bushing 14 (with reference to FIG. 2), which is firmly connected to the guide rod 13, and, on the other hand, on the right-hand slide bushing 15 (with reference to FIG. 2), which is fastened to the right-hand end of the carrier tube 12. Thus, the carrier tube 12 is loaded against the closing movement direction SB of the closing body 7—i.e. to the right with reference to FIGS. 2 and 3—and held in contact in the retaining piece 17. The closing body 7 is thus in the open position of the explosion protection valve shown in FIGS. 2 and 3 and can remain in a stable manner in this open position at specified flow velocities of a medium flowing through the valve.

In the event of an explosion pressure wave passing through the explosion protection valve in the closing movement direction, the closing body 7 is abruptly entrained in this direction against the load of the helical compression spring 18 and pressed with its sealing edge 11 against a sealing ring 19 arranged on the inner side of the housing 1, thus closing the explosion protection valve. In this way, the system parts arranged on the side of the closing body opposite the explosion source, which are connected to the left-hand flange 8 via an outgoing pipe, are protected from the explosion pressure wave and are decoupled from the system part on the interference side. In the closed position of the closing body 7, which is not shown in the figures, the latter is locked via a locking device V to be discussed in more detail, so that the valve remains closed until its reset which can be initiated manually.

In the following, with reference to FIGS. 2 to 4, the special design of the sealing ring 19 of the explosion protection valve interacting with the sealing edge 11 of the closing body 7 will be explained in more detail. For instance, for receiving the sealing ring 19 on the inner side 20 of the housing 1 at the transition passage of the tubular housing portion 5 to the radial extension in the direction of the flange connection 2, a circumferential receiving pocket 21, which is open against the closing movement direction SB, is provided for holding the sealing ring 19. On its radially inwardly facing side, this receiving pocket 21 is formed by the end region 22 of the tubular housing portion 5 itself. The latter is surrounded by the shoulder region 23 of the housing half 3, which is chamfered in cross-section. The sealing ring 19 is inserted into said receiving pocket 21 by means of an anchoring portion 24, which has a substantially flat-rectangular cross-sectional shape corresponding to the cross-sectional shape of the receiving pocket 21. Ribs or barbs may be provided on the radially inner side. As a result, the solid anchoring portion is more flexible during assembly, but provides sufficient force against withdrawal. The insertion length E of the anchoring portion parallel to the closing movement direction SB is thereby greater by about one third than the radial thickness D of the anchoring portion 24. For fixing the anchoring portion 24 in the receiving pocket 21, the latter has a circumferential indentation 25 radially on the outside at the shoulder region 23, by means of which a form-fit connection is produced between the anchoring portion 24 and the receiving pocket 21.

A sealing portion 26 of the sealing ring 19, which interacts with the sealing edge 11 of the closing body 7 in the closed position of the valve, is located outside the receiving pocket 21 and in front of it against the closing movement direction SB. Thus, the sealing portion 26 does not engage in the free flow cross-section of the tubular housing portion 5 of the housing half 3. Rather, it smoothly merges into the tubular housing portion 5 at its radially inwardly facing rim 27, for which purpose the rim 27 is formed as a projection corresponding to the wall thickness of the tubular housing portion 5. Starting from there, the inner contour 28 of the sealing portion 26, which is flowed towards by the medium through the valve, is outwardly spherical in cross-section, forming a quarter circle. Further, the inner contour 28 then merges towards the radially outwardly pointing rim 29 into a circumferential sealing lip 30 with which the sealing portion 26 adjoins the inner side 20 of the housing half 3.

Figure 4:
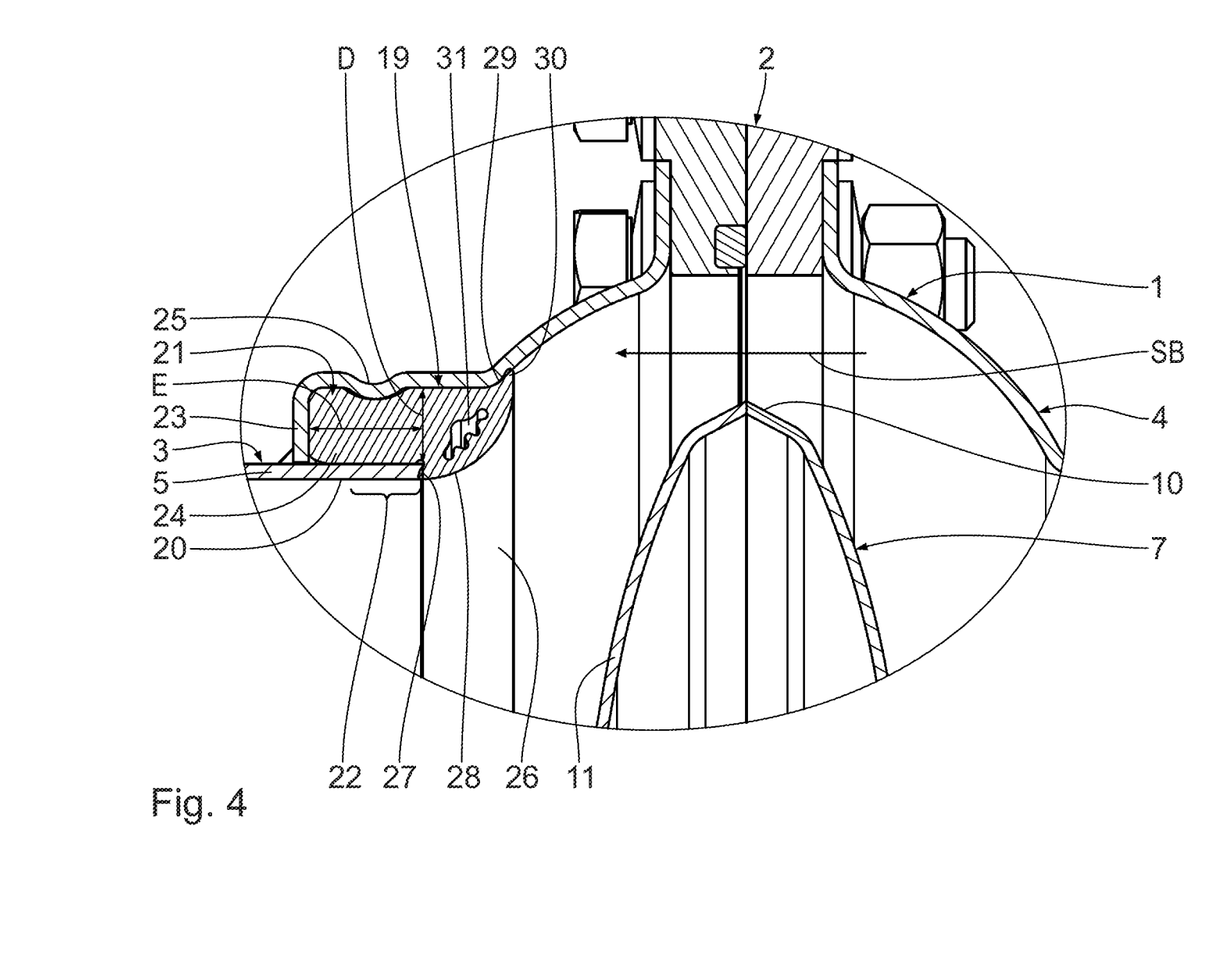

Due to the above-discussed shaping of the sealing ring 19, in particular in the region of the sealing portion 26, the free cross-section of the valve between the open closing body 7 and the inner side 20 of the housing 1 is optimized in terms of flow, as can be seen in particular from FIG. 4, since the transition passages are configured to be relatively smooth-surfaced, no undercuts are provided and no parts of the sealing engage in the free cross-section of the tubular housing portion 5. This also has advantages with regard to the avoidance of product residues and thus improved hygiene when the valve is used accordingly in sensitive industries such as systems for the production of food or pharmaceuticals.

As can be seen further in particular from FIG. 4, a circumferential, structured hollow chamber 31 is provided in the sealing portion 26 of the sealing ring 19, which gives the sealing ring 19 a particular flexibility there. This helps to ensure that the sealing edge 11 of the closing body 7 can cleanly and tightly fit. In doing so, tolerances within the entire assembly due to the welded joints, assembly deviations and out-of-roundness of the closing body 7 can be effectively compensated.

Figure 6:
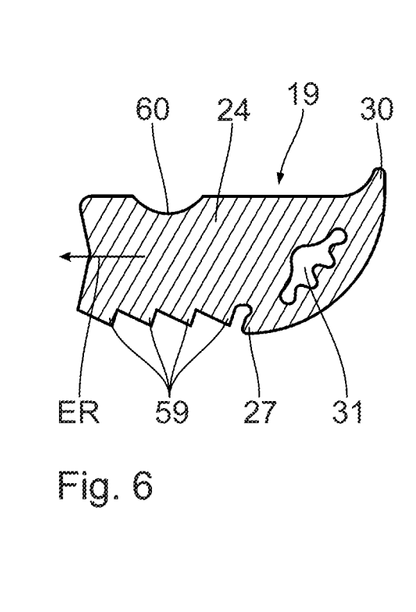
FIG. 6 shows a sealing ring in a second embodiment in cross-section.

In the further development of the sealing ring 19 shown in FIG. 6, ramp-like barb anchoring projections 59 are formed on the radially inner side of the anchoring portion 24, pointing counter to the insertion direction ER, which serve to simplify the assembly and stabilize the anchoring of the sealing ring 19 in the receiving pocket 21 as described above. On the radially outer side of the sealing ring 19 according to FIG. 6, a flat groove 60, which is shaped as a segment of a circle in cross-section and interacts with the indentation 25 on the housing 1, is also shown.

Figure 5:
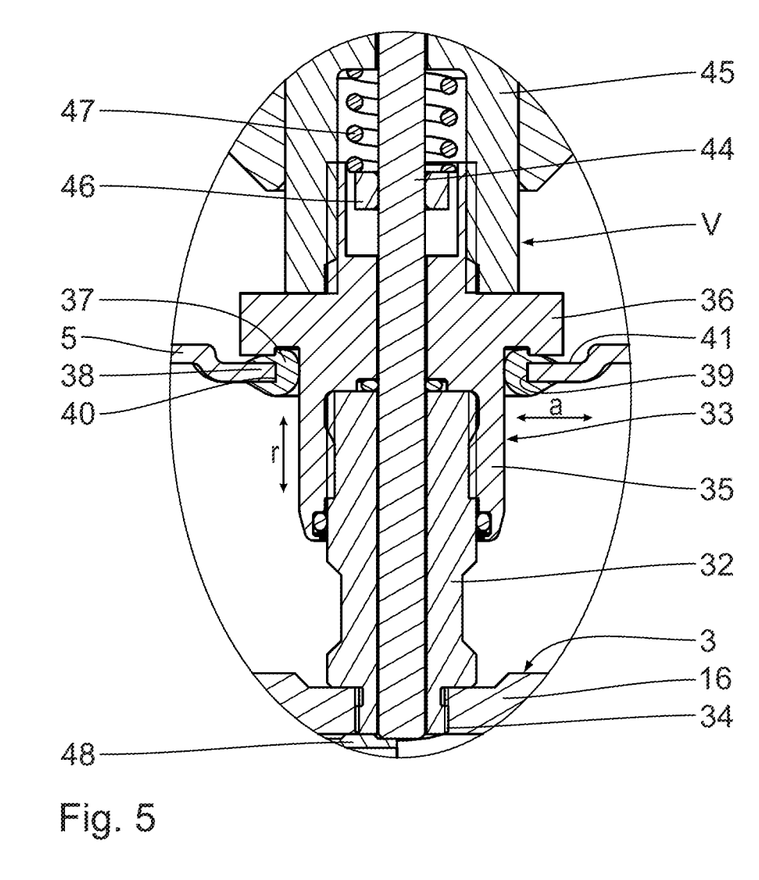

With reference to FIGS. 2, 3 and 5, the further structure of the explosion protection valve with regard to the suspension A and the locking device V as well as its mode of operation will now be described in more detail. The mentioned suspensions A of the retaining pieces 16, 17—except for the equipment of functional means to be discussed in more detail—are designed in principle in the same way for both retaining pieces 16, 17. The four suspensions A present in the embodiment shown are accordingly discussed in more detail with reference to the unit circled with the detail V in FIG. 2 and shown enlarged in FIG. 5. In this case, the retaining pieces 16, 17 support the respective ends of the guide rod 13 as a bearing assembly L and are held on the respective housing half 3, 4 of the housing 1 by means of a suspension cross-member 32 and a receiving adapter 33 holding the latter, with a bearing arrangement subject to play. For this purpose, the suspension cross-member 32 is screwed into a corresponding internal thread 34 in the retaining piece 16, 17. Similarly, the suspension cross-member 32 is received by a threaded bushing 35 on the receiving adapter 33. The latter has an annular shoulder 36, by means of which the receiving adapter 33 is supported on a flexible retaining ring 37. The latter is fastened on the rim 38 of the receiving opening 39 accommodating the receiving adapter 33 in the manner of an edge protection profile. For this purpose, the retaining ring 37 is seated with its bearing groove 40 on the rim of the receiving opening 39. As becomes clear in particular from FIG. 5, the receiving adapter 33 is mounted with play due to the construction shown. Its bearing play acts both in the radial direction r and in the axial direction a (FIG. 5). As becomes particularly clear from FIGS. 3 and 5, the receiving openings 39 for the suspensions A are each arranged in the region of planar bearing surfaces 41 on the otherwise cylindrical housing portions 5, 6. These planar bearing surfaces 41 are embossed into the corresponding housing portions 5, 6.

For a stable mounting of the two retaining pieces 16, 17, the respective suspension cross-members 32 with the receiving adapters 33 are inserted into the corresponding receiving openings 39 and the respective threaded connections are tightened via the internal thread 34 and the threaded bushing 35. Any possible dimensional deviations within the constructional parts are thereby compensated for by the bearing arrangement subject to play of the receiving adapters 33 in the receiving openings 39 via the flexible retaining rings 37.

In the case of the right-hand retaining piece 17, the suspension A serves only to support the retaining piece 17. Accordingly, the receiving adapter 33 is designed there as a closure lid 42 closed off to the outside.

The two suspensions A of the retaining piece 16 located in the closing movement direction SB, i.e. on the side of the closing body 7 opposite the explosion source, are occupied by additional functional means, namely on the one hand the upper suspension A with the locking device V, with reference to FIGS. 2 and 3, and on the other hand the lower suspension A with a sensing device C. These suspensions A thus fulfill a dual function in that, on the one hand, they support the retaining piece 16 and, on the other hand, they ensure access by the additional functional means to the functional mechanism of the explosion protection valve.

This functional mechanism, at the ends of the carrier tube 12, has a catch piece 43 formed as a truncated cone, wherein in the embodiment shown only the catch piece 43 located on the side of the locking device V is functionally relevant. On the one hand, the catch piece 43 arranged at the other end has a functional significance when a bidirectional explosion protection valve is used instead of the unidirectionally acting explosion protection valve shown. On the other hand, in the case of the unidirectionally acting valve shown, it has the function of being able to adjust the central position of the closing body relative to the flange connection 2. For this purpose, the construction shown in FIGS. 2 and 3 would have to be set up mirror-symmetrically at the parting plane T of the flange connection 2 with locking devices V and sensing devices C on both sides.

The locking device V, which is integrated in the suspension A arranged at the top left, as a central part has a radially running locking rod 44 which is guided in a radially displaceable manner in a socket 45 screwed onto the adapter 33, in the receiving adapter 33 itself and in the suspension cross-member 32. Via a collar 46, a release spring 47 configured as a helical compression spring acts to push the locking rod 44 radially inwardly when released. In the resting position shown, the locking rod 44 is retracted upwards and is retained in this resting position by a support bushing 48 which is axially shiftable in the retaining piece 16. The latter is loaded counter to the closing movement direction SB by a further helical compression spring 49.

A return mechanism 50 is configured at the upper end of the socket 45, which is known through obvious prior use. Since this return mechanism 50 has no central significance for the invention itself, a detailed description will be omitted in order to avoid unnecessary lengthiness.

On the side opposite the locking device V, the sensing device C is integrated into the suspension A, wherein in this case a sensing rod 51 is guided in a radially shiftable manner in the receiving adapter 33 and the corresponding suspension cross-member 32. A bearing cap 52 is screwed onto the receiving adapter 33, into which in turn a helical compression spring 53 is inserted for loading the sensing rod 51 via a collar 54 attached thereto in a radially inward direction. At the end of the sensing rod 51 projecting from the bearing cap 52, a feeler piece 55 is provided which interacts with a proximity switch 56. The latter is held on a bearing strut 57 at the bottom of the tubular housing portion 5. Alternatively, a mechanical switch may also be attached, which is mounted in a radial extension of the sensing rod 51 and is also mounted to the bearing strut 57 by means of an adapter sheet.

In the event of an abrupt pressure wave passing through the explosion protection valve due to an explosion in a part of the system located to the right of the valve shown, the closing body 7 is abruptly shifted in the closing movement direction SB to the left in relation to FIGS. 2 and 3 by the application of pressure against the force of the helical compression spring 18 and seals the valve in its closed position by abutting against the sealing ring 19. With the movement of the closing body 7, the carrier tube 12 is shifted with the catch piece 43, which strikes against the support bushing 48 shiftably mounted in the retaining piece 16 and also displaces same to the left against the action of the helical compression spring 49. This releases the locking rod 44 which, when the carrier tube 12 is deflected accordingly, retracts with the closing body 7 to the left behind the rear catch edge 58 of the catch piece 43. Thus, the closing body 7 and correspondingly the explosion protection valve is locked in its closed position.

During the described triggering process, the conical front portion of the catch piece 43 simultaneously pushes the sensing rod 51, which engages inwardly via a slot in the support bushing 48, outwardly against the action of the helical compression spring 53. This causes the sensing piece 55 to move away from the proximity switch 56, allowing the latter to provide an electric signal to a corresponding control (not shown) that the explosion protection valve has been triggered. Alternatively, depending on the signal required from the control, the retaining sheet of the proximity switch 56 may be rotated by 180° and the sensing piece 55 moves into the sensing region of the proximity switch 56. If a mechanical switch is used, the sensing piece is omitted and the sensing rod directly actuates the mechanical switch.

For the return of the explosion protection valve to the open position shown in FIGS. 2 and 3, the locking rod 44 is moved back upwards via the return mechanism 50. As a result, the catch piece 43 is released and the carrier tube 12 with the closing body 7 may return to the open position under the influence of the helical compression spring 18. In the process, the support bushing 48 is returned to the support position shown in FIG. 2 under the retracted locking rod 44. At the same time, the sensing rod 51 may retract again under the influence of the helical compression spring 53 into the sensing position within the support bushing 48 as shown in FIGS. 2 and 3.

The invention claimed is:

1. An explosion protection valve for decoupling one of the group comprising system parts and workpieces, the explosion protection valve comprising:
   a housing;
   a closing body which is axially guided inside the housing on a guide rod and can be shifted from a defined open position in the event of one of the group comprising a pressure wave and a suction wave in the pipeline in at least one closing movement direction into a sealing closed position in which the closing body can be fixed by means of a locking device;
   a spring assembly, which is in operative connection to the closing body, on the guide rod for holding the closing body in the open position;
   bearing assemblies each carrying an end of the guide rod, which are each connected to the housing by means of at least one suspension cross-member, wherein the at least one suspension cross-member is indirectly mounted on the housing via a receiving adapter located in a flexible retaining ring; and
   a bearing arrangement, which is subject to play, of the at least one suspension cross-member in a receiving opening on the housing.

2. An explosion protection valve according to claim 1, wherein the flexible retaining ring is fastened to form an edge protection profile with a bearing groove on a rim of the receiving opening of the housing.

3. An explosion protection valve according to claim 1, wherein the play of the bearing arrangement of the at least one suspension cross-member acts in a radial direction and an axial direction.

4. An explosion protection valve according to claim 1, further comprising a planar bearing surface applied to the otherwise tubular housing portion of the housing for the bearing arrangement of the at least one suspension cross-member in the receiving opening.

5. An explosion protection valve according to claim 4, wherein the planar bearing surface is embossed in the tubular housing portion.

6. An explosion protection valve according to claim 5, wherein all suspension cross-members are arranged for receiving functional means.

7. An explosion protection valve according to claim 1, wherein the valve is configured to be installed in a pipeline.

8. The explosion protection valve according to claim 1, wherein a functional means is integrated into the at least one suspension cross-member.

9. An explosion protection valve according to claim 8, wherein the functional means is at least one of the group comprising a locking rod of the locking device and a sensing rod of a sensing device for the valve position.

10. An explosion protection valve according to claim 8, wherein the functional means engaging in the housing are each integrated in a suspension.

11. An explosion protection valve for decoupling one of the group comprising system parts and workpieces, the explosion protection valve comprising:
   an explosion protection valve housing comprising a plurality of receiving openings;
   a closing body which is axially guided inside the explosion protection valve housing on a guide rod and can be shifted from a defined open position in the event of one of the group comprising a pressure wave and a suction wave in the pipeline in at least one closing movement direction into a sealing closed position in which the closing body can be fixed by means of a locking device;

a spring assembly, which is in operative connection to the closing body, on the guide rod for holding the closing body in the open position;
a first suspension member;
a second suspension member;
a first bearing assembly carrying one end of the guide rod, the first bearing assembly being connected to the explosion protection valve housing via the first suspension member, the first suspension member comprising a first bearing arrangement, which is subject to play, at least a portion of the first bearing arrangement being arranged in one of the receiving openings of the explosion protection valve housing, wherein the first suspension member is indirectly mounted on the explosion protection valve housing via a receiving adapter located in a flexible retaining ring; and
a second bearing assembly carrying another end of the guide rod, the second bearing assembly being connected to the explosion protection valve housing via the second suspension member, the second suspension member comprising a second bearing arrangement, which is subject to play, at least a portion of the second bearing arrangement being arranged in another one of the receiving openings of the explosion protection valve housing.

12. An explosion protection valve according to claim 3, wherein the second suspension member is indirectly mounted on the explosion protection valve housing via a receiving adapter located in a flexible retaining ring.

13. An explosion protection valve for decoupling one of the group comprising system parts and workpieces, the explosion protection valve comprising:
an explosion protection valve housing comprising a plurality of receiving openings and an explosion protection valve housing interior space;
a closing body which is axially guided inside the explosion protection valve housing on a guide rod and can be shifted from a defined open position in the event of one of the group comprising a pressure wave and a suction wave in the pipeline in at least one closing movement direction into a sealing closed position in which the closing body can be fixed by means of a locking device;
a spring assembly, which is in operative connection to the closing body, on the guide rod for holding the closing body in the open position;
a first suspension member;
a second suspension member;
a first bearing assembly carrying one end of the guide rod, the first bearing assembly being connected to the explosion protection valve housing via the first suspension member, the first suspension member comprising a first bearing arrangement, which is subject to play, at least a portion of the first bearing arrangement being arranged in one of the receiving openings of the explosion protection valve housing, at least another portion of the first bearing arrangement being arranged in the explosion protection valve housing interior space, wherein the first suspension member is indirectly mounted on the explosion protection valve housing via a receiving adapter located in a flexible retaining ring; and
a second bearing assembly carrying another end of the guide rod, the second bearing assembly being connected to the explosion protection valve housing via the second suspension member, the second suspension member comprising a second bearing arrangement, which is subject to play, at least a portion of the second bearing arrangement being arranged in another one of the receiving openings of the explosion protection valve housing, at least another portion of the second bearing arrangement being arranged in the explosion protection valve housing interior space.

14. An explosion protection valve according to claim 13, wherein the second suspension member is indirectly mounted on the explosion protection valve housing via a receiving adapter located in a flexible retaining ring.

\* \* \* \* \*